US010667079B2

United States Patent
Alexander et al.

(10) Patent No.: US 10,667,079 B2
(45) Date of Patent: May 26, 2020

(54) VIRTUAL BEACON SYSTEM

(71) Applicant: Cohda Wireless Pty Ltd, North Adelaide OT (AU)

(72) Inventors: Paul D Alexander, North Adelaide (AU); Paul K Gray, North Adelaide (AU); Steve Statler, San Diego, CA (US)

(73) Assignee: Cohda Wireless, Wayville (AU)

( * ) Notice: Subject to any disclaimer, the term of this patent is extended or adjusted under 35 U.S.C. 154(b) by 0 days.

(21) Appl. No.: 15/224,585

(22) Filed: Jul. 31, 2016

(65) Prior Publication Data
US 2019/0141475 A1    May 9, 2019

(51) Int. Cl.
H04W 4/021 (2018.01)
H04W 4/02 (2018.01)
G08B 21/18 (2006.01)
H04W 4/23 (2018.01)
H04W 4/029 (2018.01)
G06Q 30/02 (2012.01)

(52) U.S. Cl.
CPC .......... H04W 4/021 (2013.01); G08B 21/182 (2013.01); H04W 4/023 (2013.01); H04W 4/029 (2018.02); H04W 4/23 (2018.02); G06Q 30/0235 (2013.01)

(58) Field of Classification Search
CPC ..... H04W 4/0021; H04W 4/23; H04W 4/029; H04W 4/023; G08B 21/182
USPC .................................................... 340/539.13
See application file for complete search history.

(56) References Cited

U.S. PATENT DOCUMENTS

| 2010/0279665 | A1* | 11/2010 | Hardin | G06Q 30/02 455/414.1 |
| 2011/0087497 | A1* | 4/2011 | Avallone | G06Q 30/02 705/1.1 |
| 2011/0191150 | A1* | 8/2011 | Blackhurst | G06Q 20/322 705/14.1 |
| 2015/0213502 | A1* | 7/2015 | Minter | G06Q 30/0267 705/14.64 |
| 2015/0278829 | A1* | 10/2015 | Lu | G06Q 30/0201 705/7.29 |
| 2016/0210682 | A1* | 7/2016 | Kannan | G06Q 30/0261 |

(Continued)

OTHER PUBLICATIONS

Beacon Technologies. The Hitchiker's Guild to the Becosystem, Stephan Stalter. Enter Book, but special relevance contained in Chapters 16-19 which discuss Gefencing, product codes and cellular network technologies.

(Continued)

*Primary Examiner* — Kerri L McNally
(74) *Attorney, Agent, or Firm* — Emstone Law

(57) ABSTRACT

A virtual beacon system that provides proximity alerts is described. The proximity alerts are based on the location of a mobile device (100) and a location of interest. The method may include the steps of providing sensor readings for signals, calculating a mobile device location, determining the distance between a mobile device and a product location (202) and generating a proximity trigger (208). A described virtual beacon system includes a monitoring access point (104) for providing sensor readings and transmitting proximity triggers, a location cloud service (106) for calculating a mobile device (100) location and proximity alert service (108) for generating proximity triggers based on the mobile device location.

20 Claims, 3 Drawing Sheets

(56) References Cited

U.S. PATENT DOCUMENTS

2016/0295299 A1* 10/2016 Kang .................. H04N 21/812

OTHER PUBLICATIONS

Beaconstac.com, "Virtual Beacons, Next Gen Beacons are Here", Neha, Mallik http://blog.beaconstac.com/2015/04/virtual-beacons-next-gen-beacons-are-here/.

* cited by examiner

VIRTUAL BEACON SYSTEM

BRIEF SUMMARY OF THE INVENTION

The present invention is related to the field of digital communications. More particularly, the present invention is related to a virtual beacon system for providing proximity alerts based on the location of a mobile device and a location of interest.

BACKGROUND OF THE INVENTION

Proximity beacon support (including, but not restricted to, Bluetooth beacon support) has been added to mobile phone operating systems. Beacons are transmitters that may be located near points of interest. The beacons allow passing receivers to be notified that they are near those points of interest. The beacons may be fixed or mobile depending on the application.

Proximity beacon support is available to mobile app developers through APIs (application programming interfaces) for region monitoring and proximity ranging. Region monitoring enables mobile apps to register proximity triggers that call back when the mobile operating system detects a particular beacon is within range of the mobile device. Ranging enables the measurement of the mobile device's proximity to that beacon. Mobile applications that have exited or are paused in the background can be awoken by the operating system's region monitoring function to perform actions that are relevant to the phone being near a particular location. These actions include providing special offers or other notices of nearby products or attractions, triggering analytical or audit functions, such as to record the presence of a device in a secure part of a research facility, or to enable of disable functions such as wireless access for phones being used in the vicinity of a driver's seat in a car.

There are a number of problems associated with proximity beacon systems. One problem is that that the beacons themselves can be inconsistent in triggering region monitoring events. Additionally, the "beacon based ranging" used to estimate location can be inaccurate. The ranging functions rely on techniques such as received signal strength indication (RSSI), which are very susceptible to interference, signal attenuation and multipath effects. These inaccuracies become compounded; so the further the mobile device is from a beacon the less accurate the proximity measurement is. In addition, the cost of purchasing the large numbers of beacons in a venue can become onerous and the cost of the labor to deploy and maintain the beacons, including replacing batteries periodically, can become prohibitive. This restricts the number of beacons that can be economically deployed.

Lastly, the operation of ranging functions tends to consume a significant amount of power based on much more intense use of the radio used to monitor the beacons. This depletes the life of the mobile device's battery. Thus, there is a need for a method and apparatus for delivery location based alerts without the use of proximity beacons.

BRIEF DESCRIPTION OF THE INVENTION

In accordance with one embodiment of the invention, a method for operating a virtual beacon system is provided. The method may include the steps of providing sensor readings for signals received from mobile devices, calculating a mobile device location based on the sensor readings, determining the distance between a mobile device and a product location and generating a proximity trigger when the distance is less than a predetermined value.

In another embodiment of the invention a virtual beacon system is provided. The virtual beacon system includes a monitoring access point for providing sensor readings for mobile devices and transmitting proximity triggers, a location cloud service for calculating a mobile device location based on the sensor readings and proximity alert service for generating proximity triggers based on the mobile device location.

In another embodiment of the invention a second virtual beacon system is provided. The second virtual beacon system includes a monitoring access point for monitoring the location of mobile devices and transmitting proximity triggers, a location of interest database for providing locations of interest, product location database for providing a product location and a proximity alert generator for generating a proximity triggers using the locations of interest and the product location.

By performing server side monitoring using the Mobile Access Points as disclosed in the method and apparatus described here, less intense processing by the mobile device is required and therefore the battery life of the mobile device is preserved and prolonged.

DETAILED DESCRIPTION OF THE INVENTION

Figure 1:
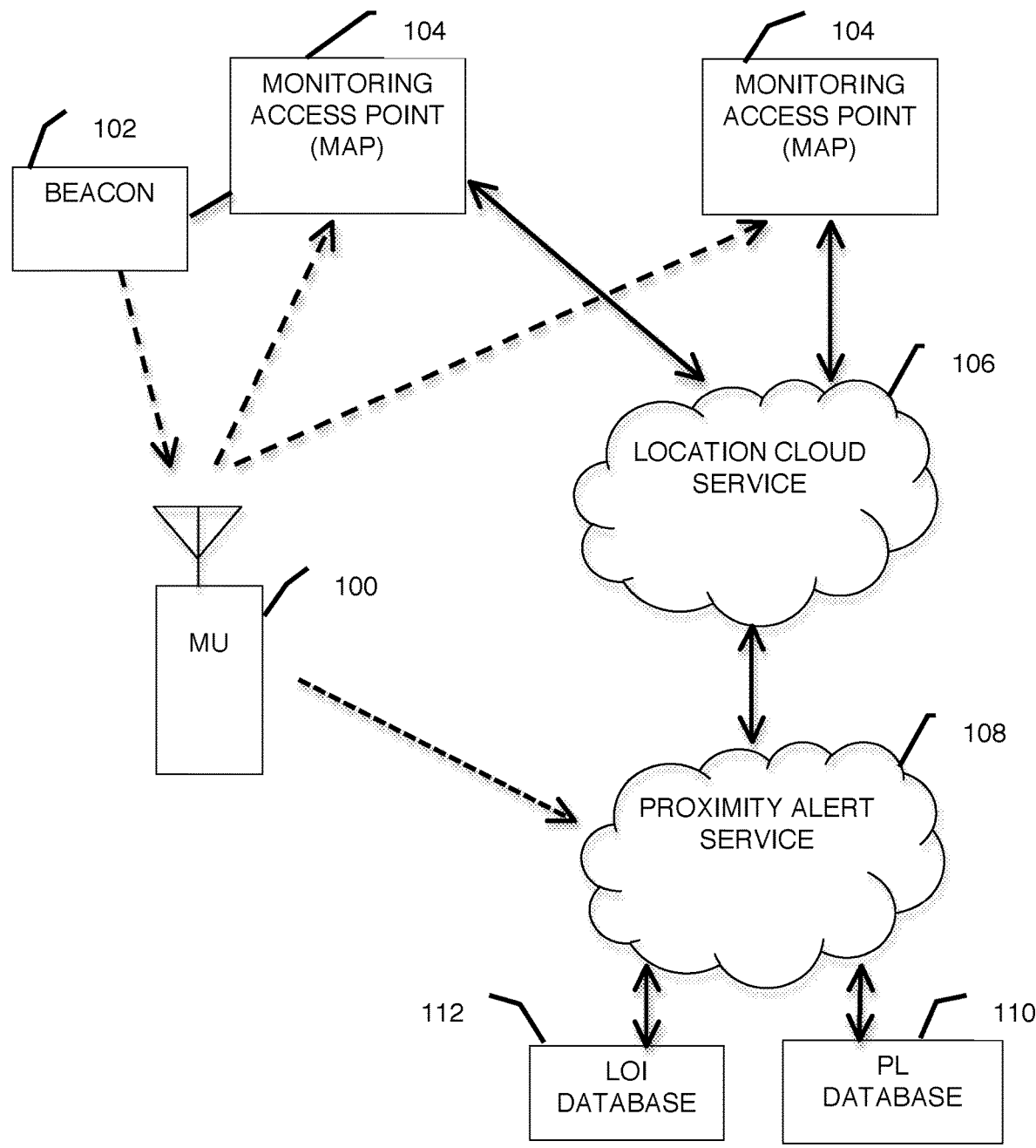
FIG. 1 is a block diagram of a wireless communication network configured in accordance with one embodiment of the invention.

FIG. 1 is a block diagram of a wireless communication network configured in accordance with one embodiment of the invention. Mobile unit (MU) 100 transmits and receives radio frequency signals while conducting wireless communications. The received signals may include beacon alert transmissions from beacon source 102, with an identifier such as a UUID (Universal Unique Identifier), which is associated with a location of interest. The location of interest may be, for example, a product, kiosk or attraction.

Monitoring access points (MAPs) 104 will identify mobile unit 100 from signals received. Additionally, MAPs 104 perform signal analysis on those received signals. The signal analysis parameters will be forward to location cloud service 106. The signal analysis parameters may include the strength of the signal received as well as the distance, Doppler and angle of arrival of the received signals. The parameters may include the location of mobile unit 100 or the estimate direction of mobile unit 100 relative to the location of the MAP 104.

Additionally, other parameters may be used during the receive packet processing. One example of the processing of other signal related parameters is described in U.S. patent application Ser. No. 13/511,663 entitled "Extracting Parameters from a Communications Channel" assigned to the assignee of the present invention and incorporated herein in its entirety by reference.

In some embodiments of the invention, a beacon 102 will be completely autonomous. It will just transmit whatever information it has been programmed to transmit in the proscribed manner. In other embodiments, a beacon 102 may be linked to MAP 104, which will exercise some control over beacon 102. This control can include instructing it to transmit only to certain MUs 100. The control may also include when to transmit. Any type of control from MAP 104 to beacon 102 is contemplated in various different embodiments of the invention.

In one alternative embodiment of the invention, MAPs 104 may also receive signals from a beacon 102. This may occur when a newly placed beacon is detected. Because beacon 102 is typically a low cost low power transmitter that repeatedly sends out a signal announcing a point of interest (which may be a nearby product or attraction. In some embodiments of the invention) MAP 104 will forward notification of the receipt of a signal from beacon 102 point of interest (POI) database which will be updated with the new information. In this way, the MAP's 104 may update any product location database as described below.

In some embodiments of the invention, the POI database may retain this location of interest even if the corresponding beacon 102 has failed to function. In other embodiments of the invention, beacon 102 may transmit timing information indicating the duration or time of day during which the point of interest is valid. The PAS 108 may also use the new product information to send proximity alerts to other devices that are not equipped to detect the signal from beacon 102, expanding the number of devices a beacon 102 can effectively reach.

In accordance with one aspect of the invention this list may be cross-referenced with a list of products or objects of interest within a venue. To build this database a product location service (PLS) mobile app may be used to scan the products, identify them and record the location of the product. In some embodiments the MAPs 104 may be used to determine an accurate record of the location of the phone at the time it scans each product. The product location may be transmitted to the PAS using a MAP 104 or via cellular data services or other Internet based connection.

For example, in one mode the MAP 104 is monitoring the MU 100. The operator of MU 100 may position the MU 100 near a product of enter information about the product into the MU. The information may be entered actively by the user by a scanner or camera or by receiving information from a beacon 102. The MU 100 may also passively detect the presence of a product or other item of interest via, for example, RFID tag.

The PLS mobile app (or the user) may then request the PAS 108 or latch (or record) that position against that product either internally or in one of the available databases. It is this final act that requires the connection between the MU 100 and the PAS 108 as described above including cellular, wireless or packet based connection. This information is preferably stored in the product location database 110. Product location database 110 may also track pricing information and discount offers or other promotions that may be used in the determination whether to send proximity alerts. Time windows (segments) of availability for the products (or locations) or special offers may also be stored.

In another mode use user, or an app running on the MU 100, will directly access the PAS 108 in order to register their interest in a product or service. The MU does not need to be near the product in this case. This information can be used later to alert the MU 100 when this product, service (or attraction) is nearby as described in greater detail throughout the application.

In accordance with one embodiment of the invention, location cloud service 106 receives the signal parameters from MAPs 104 and determines the location of mobile unit 100. This location information is delivered to proximity alert service (PAS) 108.

PAS 108 may optionally receive product location information from product location (PL) database 110. This information may include the bar code(s), QR Code(s), RFID or SKU number of the product, product category as well as the location or locations at which the product may be found, including the location within a retail store where the product may be obtained. Additionally, PAS 108 may receive location of interest information from location of interest (LOI) database 112. A location of interest may be provided in the form of coordinates including 2D or 3D coordinates. The location of interest may also be defined as a region or "geofenced" area including, for example, a fence (real or virtual) around a number of products, a desk or a corridor. The location of interest could also be a queuing space such as an airport boarding gate. The area (or volume) can take any shape including polygons, cylinders or prisms.

In some embodiments of the invention, PAS 108 stores a list of mobile units 100 and various products of interest and/or locations of interest associated with those mobile units. For each POI/LOI a specific alert code will be recorded which will cause the application on a mobile unit 100 to be activated via a callback. PAS 108 will compare the location of mobile unit 100 with the locations of the products and/or locations of interest as the location of a mobile unit 100 is tracked. When the relationship between location of the mobile unit 100 and the location of interest satisfies a predetermined criteria, PAS 108 will generate a proximity alert. Similarly, when the relationship between the location of the mobile unit 100 and the location of a product of interest satisfy a predetermined criterion (or criteria), PAS 108 will generate a proximity alert.

The criteria may include being less than a predetermined distance from the POI or LOI, or being within the LOI if it is defined as a region as described above. Additionally, the time of day may be considered in evaluating the satisfaction of the criteria. Also, the interests and past behavior of the user of mobile unit 100 may be considered in the criteria. This past behavior can include purchasing history, movie-viewing history, and browsing or search history. For example, a user known to have purchased tobacco products in the past may be alerted to proximity to a tobacco retailer. The use of other criteria is consistent with other embodiments of the invention such as lower price or special offer.

The proximity alert is preferably transmitted to the mobile unit 100 via a wireless network to which mobile unit 100 is monitoring such as wireless cellular communications network or a Wi-Fi or Bluetooth style broadcaster as depicted in FIG. 1, Beacon 102.

In a preferred embodiment, the location information for the product location as well as the locations of interest polygon may be stored using a three-dimensional coordinate, although the use of a two dimension coordinate is consistent with some embodiments of the invention. The use of a three dimensional coordinate system allow for product locations, for example, to be specified with to the exact floor of a multi-floor building or shelf in a display that may have different products at each shelf level in the display.

Figure 2:
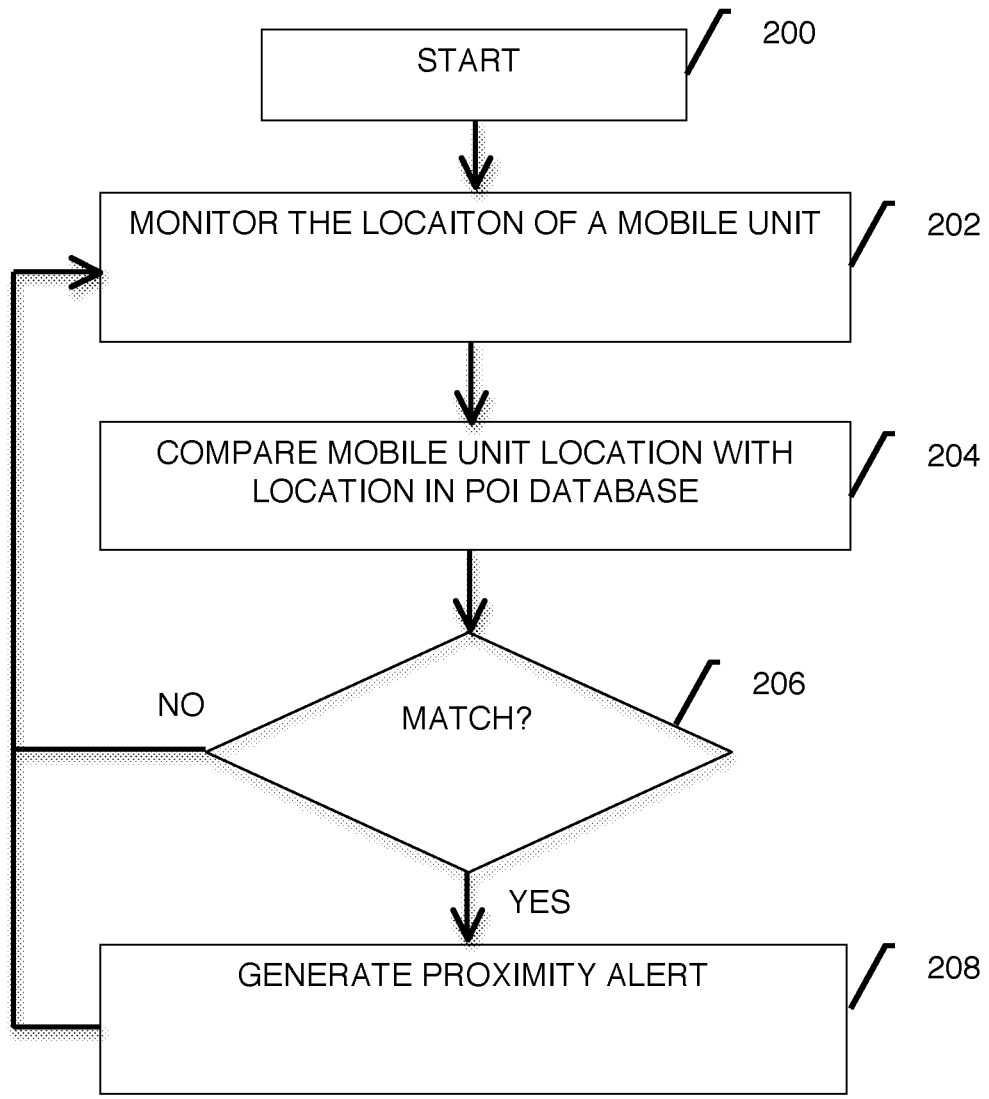
FIG. 2 is a flow chart illustrating the steps performed in accordance with some embodiments of the invention.

FIG. 2 is a flow chart illustrating the steps performed in accordance with some embodiments of the invention. At step 200 the processing starts and at step 202 the location of a mobile unit is monitored. At step 204 the location of the mobile unit is compared with location in a point of interest (POI) database. At step 206 it is determined if there is a match.

If it is determined at step 206 that a match has been detected then a proximity alert is generated at step 208, and then monitoring of the location of the mobile unit is continued at step 202. If it is determined at step 206 that no match has been detected, then monitoring of the location of the mobile unit is continued at step 202. The alert sent corresponds to the predetermined alert code associated with the LOI.

In accordance with one embodiment of the invention, mobile units 100 may run location sensitive mobile (LSM) apps that used a location interest monitoring (LIM) service. The LSM app will register with the proximity alert service (PAS). The registration can take many forms in different embodiments of the invention including passing a Universally Unique Identifier (UUID) of the LOI to be monitored to the PAS via the wireless interface. The UUID may be supplemented with additional numbers to identify a subset of multiple LOIs associated with a single UUID. I hierarchal UUID system may be used in some embodiments of the invention, including UUIDs that have a common portion for a particular retailer combined with a unique portion for products located at that retailer.

In one embodiment of the invention, the MAPs will monitor the radio traffic in their coverage area to search for a MU and a LSM app that has registered for LIM service. When the MU is detected the MAP will forward the signal parameters and the MU+LSM app identifier to the location cloud service, which will compute the location of the MU, and forward the location information, MU and LSM app to the PAS.

The LSM apps may use a Software Developer Kit code library (SDK) that executes within the context of each LSM app. The LSM app will call the PAS service to perform the registration and alerting functions. The SDK will be used by the LIM service as a wrapper to encapsulate the service calls to register the locations of interest that the LSM app needs to be notified about when the mobile unit the LSM app is running on passes inside the boundary of the location of interest.

Since multiple instances of the LSM app may be present on a variety of MUs in a given venue, when the Beacon 102 sends an alert based on one of the affected MUs being in proximity of a LOI, the SDK with check with the PAS to verify whether it is the device that is within the bounds of the LOI. If it is, the callback will be made to the LSM app, if it is not the alert will be disregarded.

Figure 3:
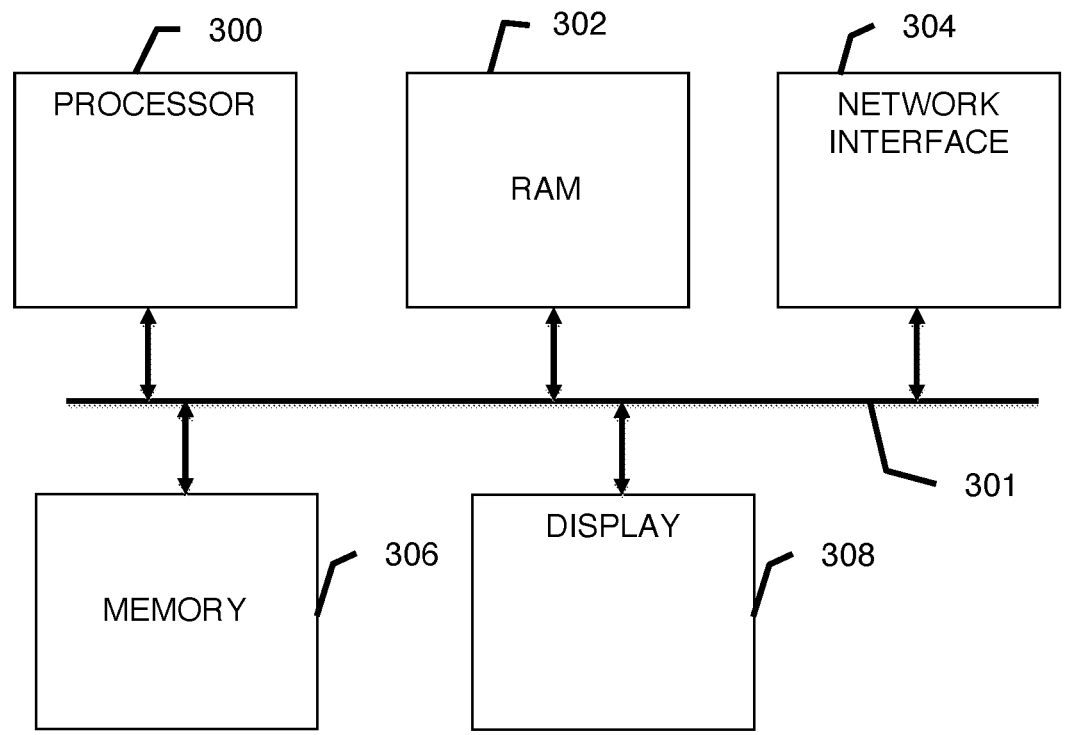
FIG. 3 is a block diagram of a proximity alert service when configured in accordance with one embodiment of the invention.

FIG. 3 is a block diagram of a proximity alert service when configured in accordance with one embodiment of the invention. In this embodiment processor 300 is coupled to random access memory (RAM) unit 301 and network interface 304 via bus 300. Additionally, memory unit 306 is coupled to bus 300. Memory 306 is typically a hard disk drive or some form of non-volatile memory including solid-state storage devices.

During exemplary operation, software instructions stored in memory 306 are applied to processor 300 and RAM 302 via bus 301. Processor 300 controls RF interface 304 via bus 301 in response to these software instructions. Additionally, processor 300 exchange data with network interface 304 including information that is received and transmitted via network interface 304. Processor 300 may also cause certain output to be displayed on display element 308.

Processor 300 will receive the information provided by network interface 304 including the location of the mobile unit as well as the location of interest and points of interest that are discussed throughout this application. In response to the information and software instructions processor 300 will performed the various steps and operations described throughout the application. The other systems described throughout the application may also be configured in a manner similar to that shown in FIG. 3 in some embodiments of the invention including MAPs 104 or mobile units 100.

Other embodiments of invention include a virtual beacon system including monitoring access point for providing sensor readings for mobile devices and transmitting proximity triggers, location cloud service for calculating a mobile device location based on said sensor readings and proximity alert service for generating proximity triggers based on said mobile device location.

In one embodiment of the invention, the proximity alert service generates a proximity trigger when a mobile device is located within a predetermined distance from a product of interest.

Another embodiment of the invention includes a location of interest database for providing a location of interest to proximity alert service.

Another embodiment of the invention includes a product location database for providing a product location to said proximity alert service.

In one embodiment of the invention the proximity alert service receives product interest registrations for mobile devices.

In one embodiment of the invention the proximity alert service generates a proximity trigger when a mobile device is located within a predetermined distance from a product of interest for a predetermined duration.

Thus, a virtual beacon method and apparatus has been described. While various embodiments of the inventions have been set forth herein, the invention should not be limited to those described embodiments. Rather, the scope of the invention is set forth more particularly in the following claims.

The invention claimed is:

1. A method for operating a virtual beacon system within a building comprising the steps of:
   receiving a beacon alert transmission from a beacon source located within the building, said beacon alert transmission identifying a beacon related product and said beacon source being located in proximity to said product;
   calculating a location of said beacon source based on said beacon alert transmission;
   storing said location and said product for a predetermined period of time;
   providing sensor readings for signals received from mobile devices;
   calculating a mobile device location based on said sensor readings;
   determining a distance between a mobile device and said location of said beacon source; and
   generating a proximity trigger when said distance is less than a predetermined value and less than said predetermined period of time has expired.

2. The method as set forth in claim 1 wherein said proximity trigger is generated when said distance remains less that said predetermined value for a predetermined amount of time.

3. The method as set forth in claim 1 further comprising the step of:
   transmitting said proximity trigger.

4. The method as set forth in claim 1 further comprising the step of:
  retrieving a set of product locations;
  comparing said mobile device location with said set of product locations.

5. The method of claim 1 further comprising the step of updating a location of interest database by adding said beacon related product and said location of said beacon source.

6. The method as set forth in claim 1 wherein said beacon alert transmission is a radio frequency transmission and said step of calculating a location of said beacon source is comprised of the steps of:
  a) generating a first frequency domain channel estimate for said beacon alert transmission, said frequency domain estimate including features caused by multipath;
  b) generating a first time domain estimate from said first frequency domain channel estimate, wherein said first time domain estimate includes distance, doppler and angle of arrival;
  c) calculating a location of said beacon source by triangulation using an angle of arrival from said first parameter set and an angle of arrival from said second parameter set.

7. The method of claim 6 further comprising the step of:
  identifying a match between said beacon related product to a product in a product of interest database and performing said step of generating of a proximity trigger in response to said match.

8. The method as set forth in claim 6 wherein step b) is comprised of the steps of:
  b.1) calculating a coarse estimate of tap parameters from said first frequency domain estimate, said tap parameters including delay, Doppler and delta Phase;
  b.2) generating a refined estimate of tap parameters from said coarse estimate of tap parameters using previously estimated tap parameters;
  b.3) generating a tap hypothesis based on said refined estimate; and
  b.4) removing said tap hypothesis from said refined estimate, thereby generating an improved refined estimate.

9. The method of claim 8 wherein steps b.1) through b.2) are performed again on said improved refined estimate.

10. A virtual beacon system comprising:
  monitoring access point for monitoring the location of mobile devices and transmitting proximity triggers, and for receiving a beacon alert transmission from a beacon source, said beacon alert transmission identifying a beacon related product and said beacon source being located in proximity to said beacon related product;
  location of interest database for providing locations of interest;
  product location database for providing a product location; and
  proximity alert generator for generating proximity triggers using said locations of interest and said product location.

11. The virtual beacon system as set forth in claim 10 wherein said proximity trigger is generated when a mobile device is located within a predetermined distance from said product location.

12. The virtual beacon system as set forth in claim 11 wherein said proximity trigger is generated only during a certain time period.

13. The virtual beacon system as set forth in claim 11 wherein said proximity trigger is transmitted to a mobile device using a cellular network.

14. The virtual beacon system as set forth in claim 11 wherein said proximity trigger is transmitted to a mobile device using a packet based wireless link.

15. The virtual beacon system as set forth in claim 11 wherein said proximity alert generator stores time segments associated with said locations of interest, for determining when to generate proximity alerts.

16. The virtual beacon system as set forth in claim 11 wherein said proximity alert generator comprises:
  memory for storing software instructions;
  microprocessor for generating said proximity alerts in response to said software instructions, wherein
  said proximity alert generator stores time intervals associated with said products of interest for determining when to generate proximity alerts.

17. The virtual beacon system as set forth in claim 10 wherein said proximity trigger is generated when a mobile device is located within a predetermined area around said product location.

18. The virtual beacon system of claim 10 wherein said location of interest database is updated by adding said beacon related product and said location of said beacon source to a product of interest list.

19. The virtual beacon system of claim 18 further comprising:
  point of interest database, wherein said point of interest database is updated using said location of said beacon source.

20. A system for expanding the reach of a beacon source that transmits a beacon alert for a beacon related product, and said beacon source being located in proximity to said beacon related product, said system comprising:
  monitoring access point for receiving said beacon alert, for receiving signals from mobile devices and for performing signal analysis on said beacon alert and transmitting proximity triggers;
  location cloud service for receiving said signal analysis and beacon related product information from said monitoring access point and for determining a location of said beacon source;
  location of interest database for providing locations of interest;
  product of interest database for storing the locations of products of interest; and
  proximity alert server for updating product location information in response to said location of said beacon source and said beacon related product, and further for determining a match between a product of interest from said product of interest database and a location of interest from said location of interest database, and for performing an initiation of a proximity triggers in response to said match, wherein
  said monitoring access point is further for transmitting proximity triggers to mobile devices in response to said initiation and
  said signal analysis parameters includes a strength of the signal received, distance, Doppler and angle of arrival of the received signals.

* * * * *